United States Patent
Kocher

(10) Patent No.: US 11,127,236 B1
(45) Date of Patent: Sep. 21, 2021

(54) NATIONAL ACCESS CONTROL CENTER (NACC)

(71) Applicant: Robert William Kocher, McLean, VA (US)

(72) Inventor: Robert William Kocher, McLean, VA (US)

(*) Notice: Subject to any disclaimer, the term of this patent is extended or adjusted under 35 U.S.C. 154(b) by 0 days.

(21) Appl. No.: 16/350,245

(22) Filed: Oct. 19, 2018

Related U.S. Application Data

(60) Provisional application No. 62/765,175, filed on Aug. 28, 2018.

(51) Int. Cl.
| | | |
|---|---|---|
| *G07C 9/25* | (2020.01) | |
| *G06K 9/00* | (2006.01) | |
| *G07C 9/27* | (2020.01) | |

(52) U.S. Cl.
CPC .......... *G07C 9/253* (2020.01); *G06K 9/00926* (2013.01); *G07C 9/27* (2020.01); *G06K 9/00087* (2013.01); *G06K 9/00288* (2013.01); *G06K 9/00617* (2013.01)

(58) Field of Classification Search
CPC ............ G07C 9/00563; G07C 9/00111; G06K 7/10415
See application file for complete search history.

(56) References Cited

U.S. PATENT DOCUMENTS

| | | | | |
|---|---|---|---|---|
| 2004/0002894 | A1* | 1/2004 | Kocher | G07C 9/28 705/13 |
| 2005/0171787 | A1* | 8/2005 | Zagami | G06Q 20/401 285/382 |
| 2005/0258238 | A1* | 11/2005 | Chapman | G06K 19/07381 235/380 |
| 2006/0177106 | A1* | 8/2006 | Wrage | G06F 21/32 382/115 |
| 2007/0290499 | A1* | 12/2007 | Tame | G07C 9/257 283/70 |
| 2010/0235382 | A1* | 9/2010 | Caveney | G06Q 40/00 707/769 |
| 2011/0320355 | A1* | 12/2011 | Pasha | G06Q 20/40 705/44 |
| 2012/0109829 | A1* | 5/2012 | McNeal | G06Q 50/265 705/67 |
| 2014/0285315 | A1* | 9/2014 | Wiewiora | G07C 9/37 340/5.53 |
| 2015/0007295 | A1* | 1/2015 | Hou | G06K 9/00979 726/7 |

* cited by examiner

*Primary Examiner* — Thomas D Alunkal

(57) ABSTRACT

The NACC method and system will increase security by centralizing vetting, authorization and providing authoritative biometrics for matching either at the NACC or at a requestor's facility. Automatic biometric matching will save manpower and increase security. Access authorizations for personnel are determined by the requestor's facility and communicated to the NACC. The NACC provides authoritative biometrics, templates, or authorizations as selected by the requestor's facility. The NACC will enhance personnel access to multiple facilities at stationary access points, on-the-move walking, and with individuals seeking entrance while in a vehicle. The NACC can either be in one or more bricks-and-mortar structures or in a cloud.

20 Claims, 5 Drawing Sheets

NATIONAL ACCESS CONTROL CENTER (NACC)

CROSS-REFERENCE TO RELATED APPLICATION

This application claims priority from U.S. Provisional Patent Application No. 62/765,175, filed on Aug. 28, 2018, titled "National Access Control Center" (NACC), the contents of which are incorporated herein by reference, in its entirety.

FEDERALLY SPONSORED RESEARCH

None

BACKGROUND OF THE INVENTION

Field of the Invention

The application relates to a National Access Control Center, which will provide a National center that overcomes drawbacks of the current distributed system.

Description of the Related Art

The current state of the art consists of military bases, buildings, and classified programs checking Common Access Cards (CAC), state issued driver licensees, passports, birth certificates or other issued identification cards. Valid credentials are commonly used by other persons to gain access to facilities, hospitals (for medical care under someone's medical care program), and in more recent cases, valid passports are used to for ease of travel for personnel without passports or those who wish to conceal entering a country. Many facilities will maintain their own database of authorized personnel but in today's environment, personnel travel to many facilities. For example, a person may work at Ft Belvoir but have business in the Pentagon and need to be at the Pentagon on a regular basis. The Pentagon has their own badging system. Hundreds of millions of dollars are spent annually on duplicating access authorization cards and very many loopholes exist for switching a valid ID or creating a false ID. Other organizations also have their own badging or similar identification systems. Thus, there is a need for a National Access Control Center which will provide a single integrated system to overcome the drawbacks and weaknesses of the current systems.

SUMMARY OF THE INVENTION

A method/system for increasing facility, building, and classified program access security and at the same time reducing personnel costs and increasing access throughput is provided. The National Access Control Center (NACC) would hold a person's identification number, RFID identification number, biometrics, and related security access information. Military bases, facilities, building, and classified programs would continue to authorize who has access and report their lists to the NACC. The NACC would receive an ID of a person desiring access, then, (1) look up in the NACC database the biometrics associated with the ID number, (2) look up the authorizations linked to the individual/ID number, (3) transmit the requested authoritative biometric image or template to the requestor, (4) the requestor would compare the person's live-scan biometric image to the authoritative image and determine whether a match or no match outcome is appropriate.

This method and system can also be modified to conduct the biometric matching at the NACC. The base, facility, building, or classified program requestor would send the biometric live-scan image along with the ID number. The NACC would then look up the authoritative biometric image and conduct a match. In response to a match being achieved, the NACC would look up the authorization list to see whether the matched individual is authorized to enter the requestor's facility. If so, the NACC would transmit an authorization code, confirmation, RFID number or other matching data that would match with the device the person seeking access is carrying.

According to one exemplary embodiment, a system for centralizing personnel data and allowing access through a national access control center is provided. The system includes an identification device or number selected from the list of: a Radio Frequency Identification Device (RFID); an ID number configured as a Social Security Number or Government issued ID Card number; an encrypted code; a transmission receiving device configured as an RFID transmitter and receiver. Additionally provided are a central computer system that can store a database of one or more persons; a communications system providing military bases, facilities, airports, and classified programs to enter authorizations into said central computer system. The central computer system including a data base of one or more persons, a database of biometric data on said persons, a database of authorizations for said persons, firmware and software that transmits and links the ID number and said person's biometrics and authorizations; firmware and software that transmits said person's biometrics to said requestor. A biometric sensor at said requestor's location which scans said person seeking access, a biometric matching software at said requestor's location; and, an access signal indicating whether the person is enrolled and should proceed to access the facility. According to another exemplary embodiment, a method for centralizing personnel data and allowing access through a national access control center is provided. The method including enrolling at least one person into a centralized database, obtaining the person's ID number; obtaining the person's authoritative biometrics; obtaining a person's access authorizations provided by each facility that wishes to allow access; transmitting an ID signal to said centralized database; matching said transmitted ID signal to said person's authoritative biometrics; matching said transmitted ID signal to said person's access authorizations; transmitting said person's authoritative biometrics to a facility requestor; obtaining a live-scan image of said person; comparing said person's biometrics to a live-scan at said facility, determining whether the said person's live-scan biometrics match said authoritative biometrics; and, determining whether or not access should be granted to said person.

According to another exemplary embodiment, visitors ID numbers and biometric information are checked for a match based on an ID number and biometrics and are additionally checked through a National Criminal Information Center before access is authorized. According to yet another exemplary embodiment, the national access control center is located in an Internet cloud.

REFERENCE NUMERALS

Item 1=National Access Control Center (NACC)
Item 2=Person seeking access
Item 3=Identification Tag
Item 4=Base, Building, or Controlled Area or Data that Access is being requested
Item 5=Identification of Device of the Individual
Item 6=Biometric Database on a large set of Individuals
Item 7=Authorization list allowed for each individual
Item 8=Biometric image or template transmitted to desired access point
Item 9=Biometric reader
Item 10=Biometric template matcher
Item 11=Determination of no biometric match
Item 12=Determination of biometrics match
Item 13=Authorized access signal for specific RFID device
Item 14=RFID collector and transmitter that specific RFID received is authorized
Item 15=Biometric matching units determining a biometric match or no-match
Item 16=Military bases or area facilities
Item 17=Building
Item 18=Classified programs
Item 19=Visitors
Item 20=Visitors ID and Biometric
Item 21=Visitors' personal RFID and ID Devices
Item 22=Visitor enrollment station
Item 23=National Criminal Information Center check
Item 24=Authorized Visitor Database
Item 25=Web enrollment for Authorized Persons
Item 26=Authorized Data Center of person's ID Number, Biometrics, and other related data.
Item 28=RFID sensor
Item 29 Display of match/no match results
Item 30 Cloud Computing System

DETAILED DESCRIPTION OF THE EXEMPLARY EMBODIMENTS

Figure 1:
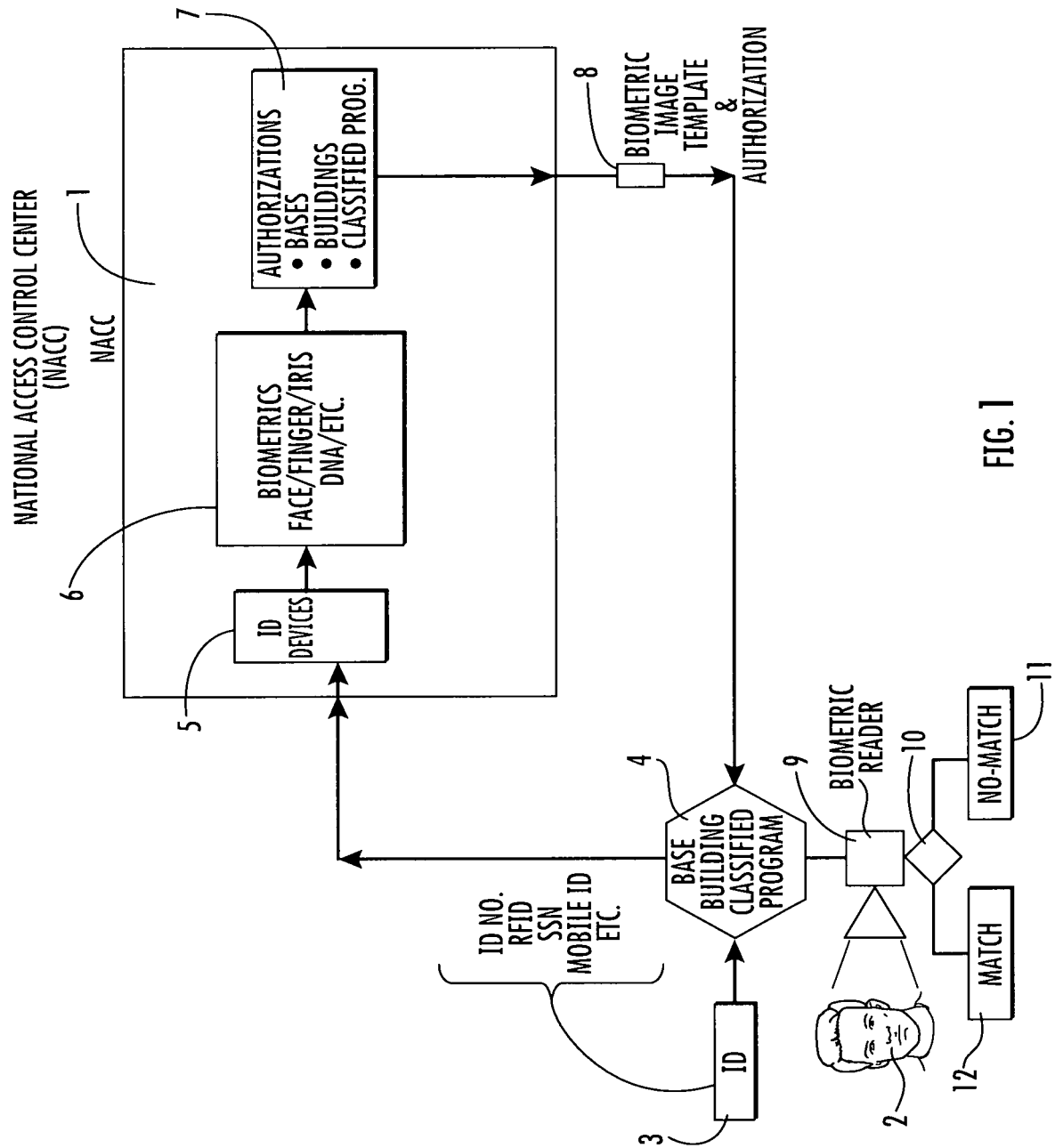
FIG. 1 Depicts NACC where a person entering is using an RFID

FIG. 1 depicts the general operation of the National Access Control Center (NACC) 1. An individual desiring access 2, to a base, building, or classified program 4 either driving in vehicle or walking, presents his RFID device 3, or, Social Security Number, Mobile Device Identification Number, or any other unique identification numbers that can be read through contactless devices. The RFID 3 signal is transmitted to the NACC 1. In the NACC, the ID Number 3, is compared to the ID devices on record and to whom the specific ID device 3, is linked to in the Biometric Database 6. Upon establishment of a link, and the person's biometric information being retrieved, the person is compared to the Authorized list for bases, buildings, and classified programs, 7 etc. In response to the individual 2 being authorized for the specific military base 4, a biometric image or template 8, is transmitted to the base 4, for further comparison. The Individual seeking access 2, presents his biometric to the biometric reader 9. The biometric reader 9, will compare the biometric 8, received from the NACC 1. The biometric matcher 10, will make the image and template comparisons and determine a match 12, or no-match 11.

Figure 2:
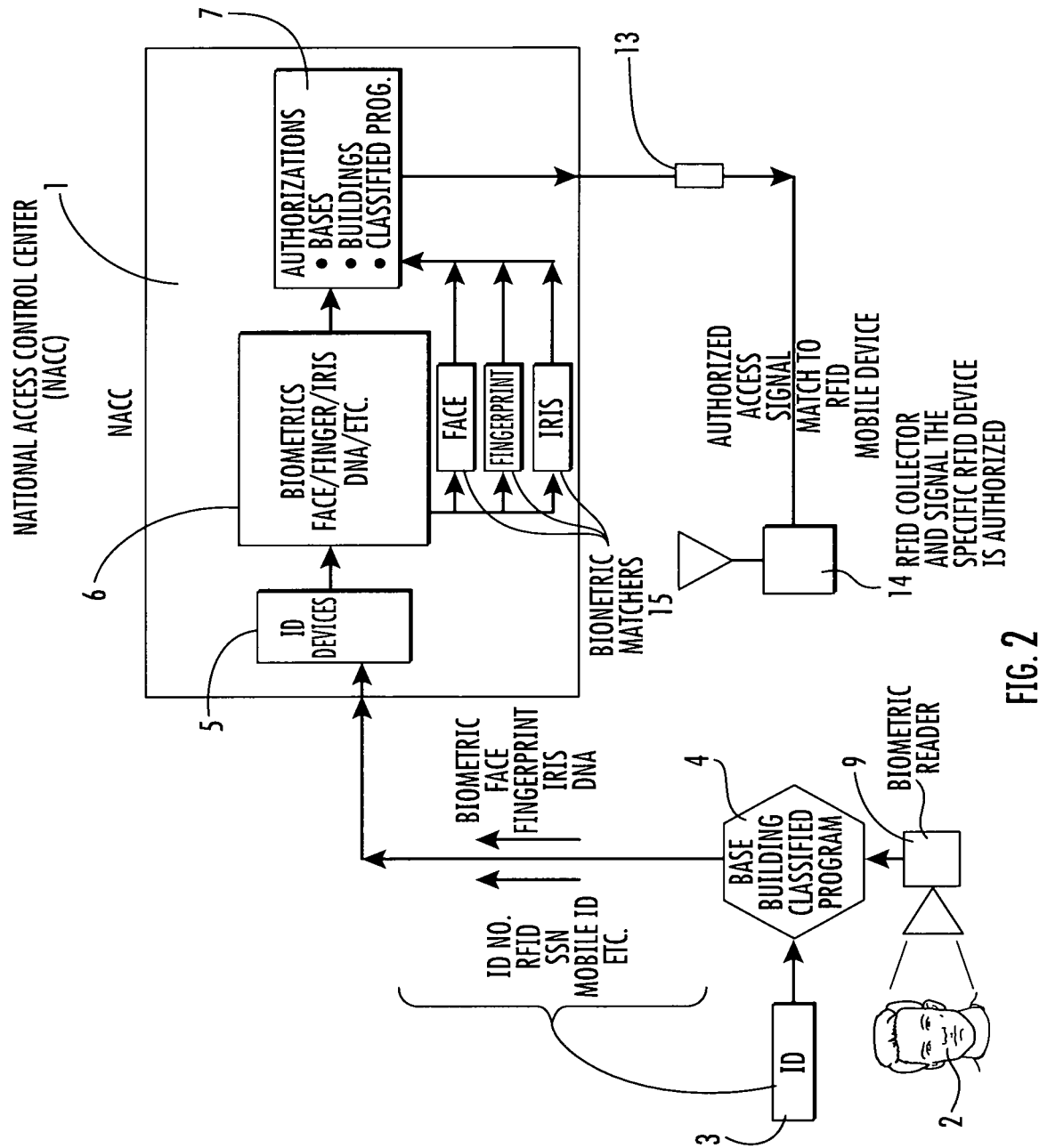
FIG. 2 Depicts NACC where person entering is sending RFID and biometric information.

An alternate exemplary embodiment is shown in FIG. 2, which depicts biometric matching occurring at the NACC 1. In this embodiment, the persons seeking access 2, approaches the biometric reader 9, and provides the RFID device 3, or unique identification number 3 along with the biometric captured by the biometric reader 9. The RFID number 3, along with the captured biometric are provided to the NACC 1, where the ID device 3, retrieves the file of the individual 2, linked to the individual's ID device. The biometric on file 6, is compared to the biometric provided from the biometric reader 9, in the biometric matching algorithms 15. Once a match is determined by the biometric matchers 15, the individual 2 is compared to the authorized data base 7. In response to the individual 2 being authorized access to the base, building, or classified program 4 from which the information 2 and 3, were sent; in response to the individual 2 being authorized, authorization access instructions, RFID Authorization, or a related authorization result 13, is sent to an access device 14. The access device 14 can be an RFID communication device that senses the authorized RFID device close to its location. The authorization device 14, then provides a signal to allow access for the individual 2.

Figure 3:
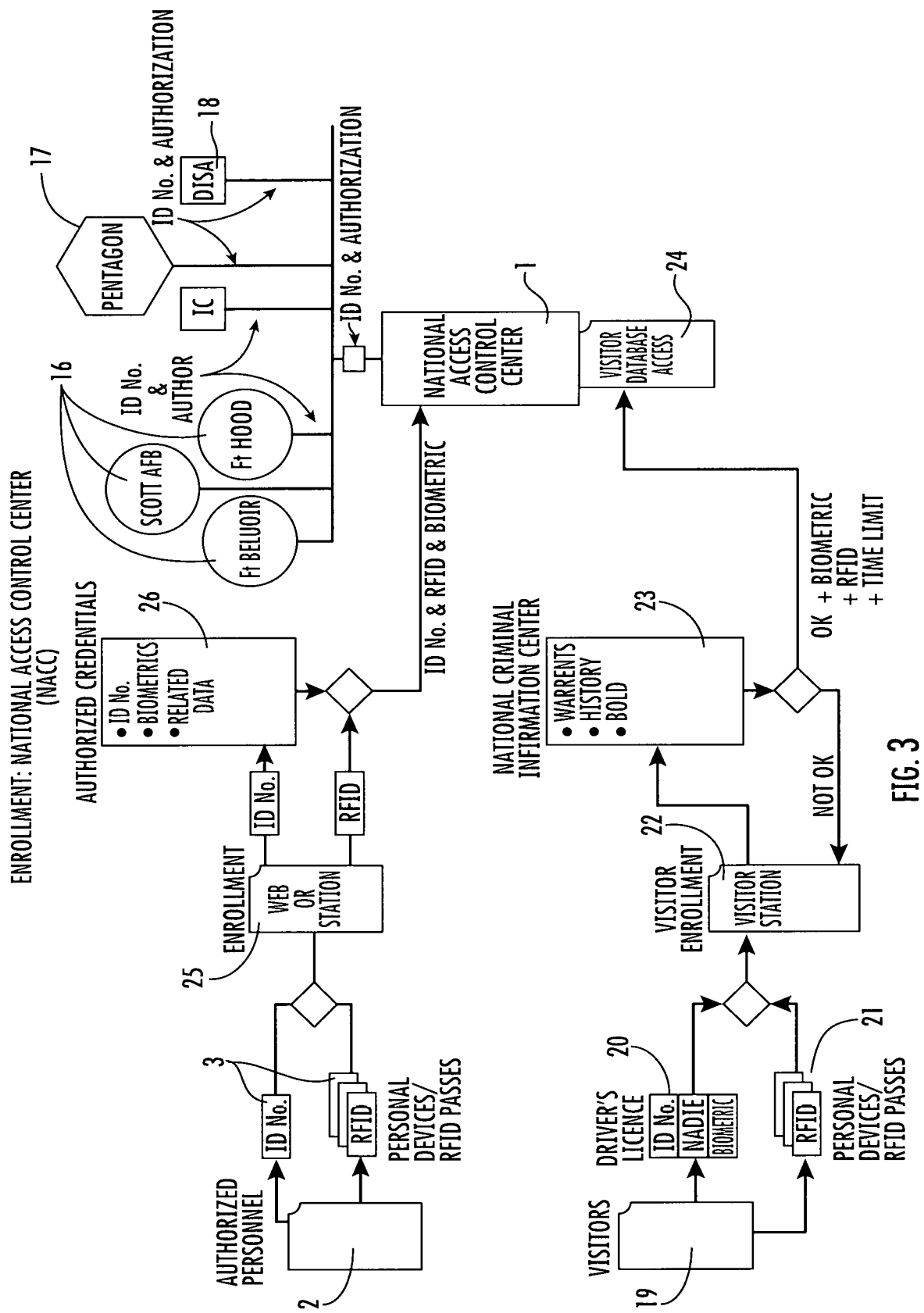
FIG. 3 Depicts NACC Enrollment process
FIG. 4 Depicts NACC Operation with Authorized Person
FIG. 5 Depicts NACC Operation in a Cloud Environment

Another exemplary embodiment is shown in FIG. 3, which depicts the Enrollment process for the NACC 1. Two types of enrollments are envisioned: (1) the authorized person 2, and (2) the visitor 19. The authorized person 2, presents an ID number 3, which is transmitted by an RFID device. The ID number 3, is matched to an authorized person in the authorized credentials database 26. For the military, the authorized credential database 26, could be the Defense Manpower Data Center (DMDC). DMDC issues the military's Common Access Card (CAC). DMDC also stores face and fingerprint data on all military and DoD personnel. The ID number and selected personnel data along with the associated and authoritative biometric data being transmitted to the NACC 1. The military bases 16, building and facilities 17, and classified programs 18, provide a database on which personnel would be authorized access. Each system authorizer 16, 17 and 18 links the authorized person to the ID number.

On the Visitor side of the method and system, the visitor 19, enters a visitor facility and submits a civilian identification 20, such as a driver's license, along with a live scan biometric such as a face photo, fingerprint, or iris. The visitor 19, also provides an RFID or personnel electronic device such as a cell phone, smart watch, or other electronic device 21, and link the device 21, to the identification provided 20. This information is provided to the visitor station 22. The visitor station vets the visitor 19 by sending the personal data such as the individual's name, driver's license number, etc. to the National Criminal Information Center (NCIC) 23, or related security check 23, to insure the visitor does not have a criminal issue that would prevent access. In response to the visitor 19, passing the security check 23, the visitor's identification data, biometrics, linked RFID and a specified time limit would be sent to visitor's section 24 of the NACC 1.

Figure 4:
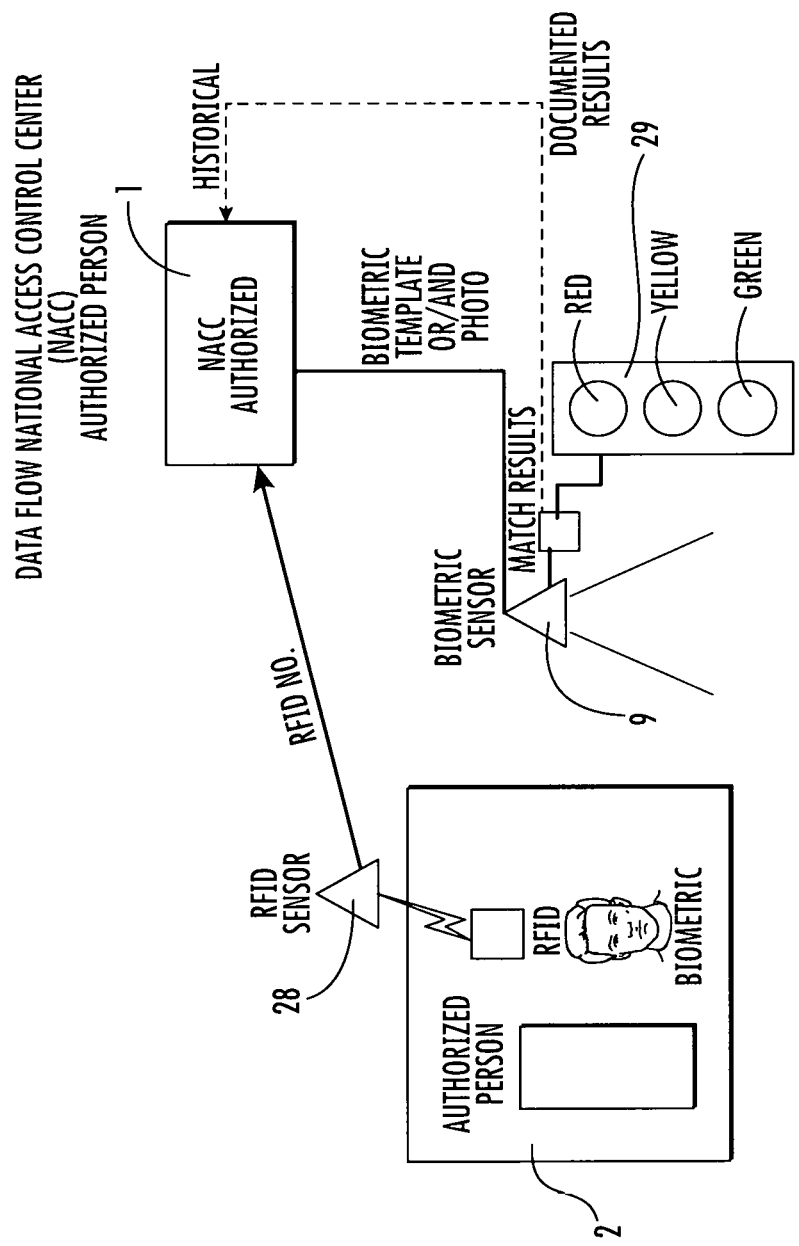

Another exemplary embodiment is shown in FIG. 4, which depicts data flow between the person requesting access 2, which provides an RFID signal to the RFID sensor 28. The RFID number is transmitted the NACC. Once the appropriate match is made between the RFID number and the person's ID number and the ID number is determined to match the requestor's facility authorization, the biometric template or image is transmitted to the requestor's facility. The requestor's facility uses a biometric sensor 9 to capture the live-scan of person 2, and compares the live-scan to the authoritative biometric provided from the NACC. The "traffic light 29" is a display which indicates whether or not a match has been determined and whether the person should proceed and be granted access.

Figure 5:
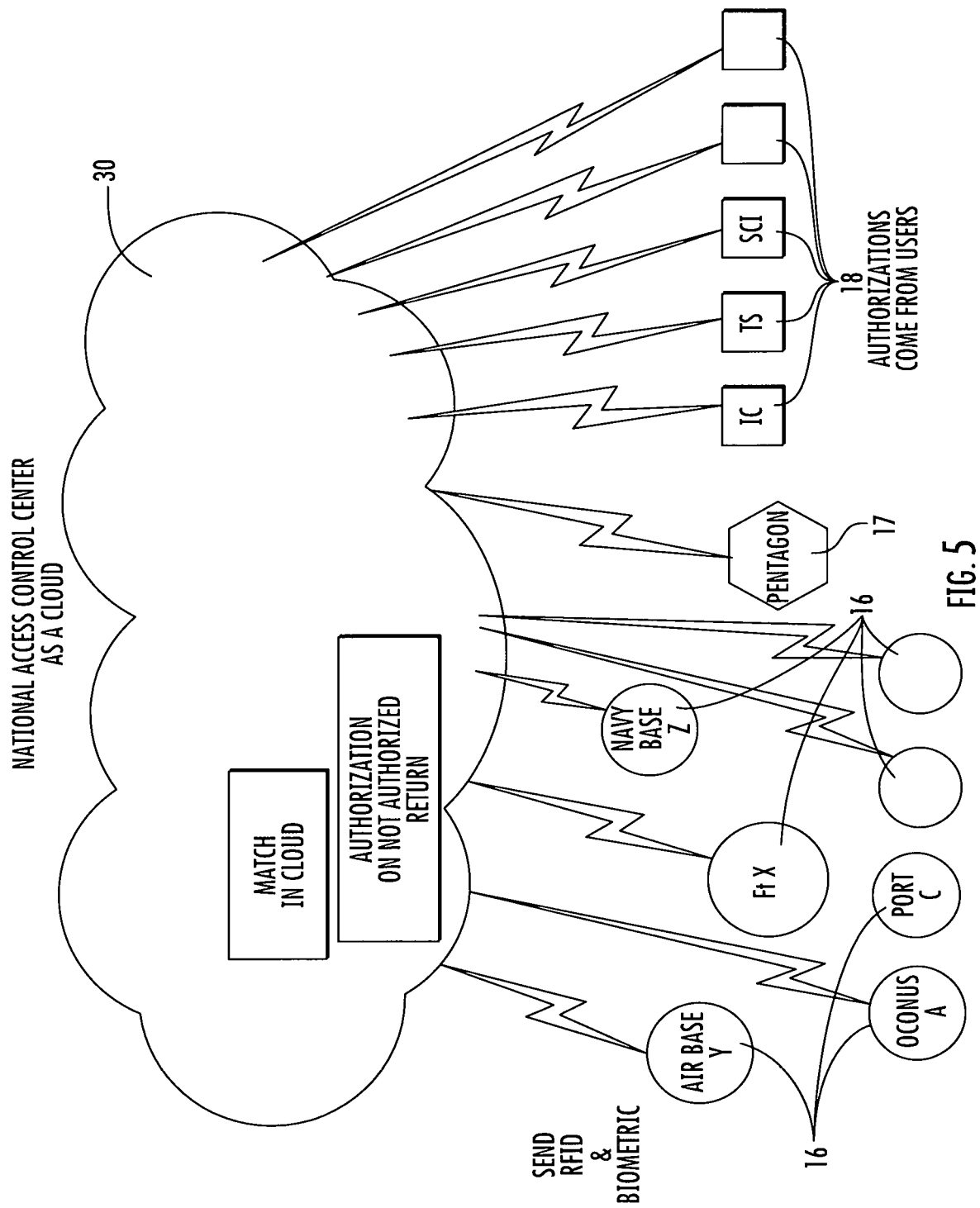

An alternate embodiment is shown in FIG. 5, which depicts the NACC located in the cloud 30. This approach allows live-scan sensors to provide images directly into the cloud for biometric matching and authorizations. This embodiment consolidates much of the computing power and significantly reduces the cost of hundreds of having stand-alone systems and matching algorithms.

The NACC method and system will increase security by centralizing vetting, authorization and providing authoritative biometrics for matching either at the NACC or at the requestor's facility. Automatic biometric matching will save manpower, will reduce costs and will significantly increase security.

Although exemplary embodiments have been shown and discussed, they should not be considered to be limiting of the invention, as other embodiments will be readily recognized by one of ordinary skill in the art. The invention is defined by the appended claims.

The invention claimed is:

1. A method for centralizing personnel data and allowing access through a national access control center, the method comprising:
  a) enrolling at least one person into a national centralized database:
  b) obtaining a person's assigned ID number;
  c) obtaining a person's authoritative biometrics;
  d) obtaining a person's access authorizations provided by each facility that wishes to allow access;
  e) transmitting from a facility requestor an ID signal to said national centralized database at the national access control center;
  f) matching said transmitted ID signal to said person's said assigned ID number and said authoritative biometrics at the national access control center;
  g) matching, at the national access control center, said transmitted ID number to said person's access authorizations;
  h) after matching the person's transmitted ID signal to said person's assigned number and matching, at the national access control center, said ID number to the person's access authorizations, transmitting said person's said authoritative biometrics from the national centralized database, to said facility requestor;
  i) thereafter obtaining a live-scan image of said person;
  j) comparing said person's biometrics to a live-scan image at said facility;
  k) determining whether the said person's live-scan biometrics match said authoritative biometrics at the national centralized database of the national access control center; and
  l) wherein the person is able to enter the facility without the requirement of biometric position pin.

2. The method of claim 1, wherein the biometrics transmitted to the national centralized database contain at least one of an image of the person's face, an image of a finger or hand, an image of the iris of the person or DNA of the person seeking access.

3. The method of claim 1, wherein the transmitted ID is one or more of an RFID tag, a social security number or a mobile phone ID.

4. The method of claim 1, wherein the authorization signal relates to one or more of a military base, an airport, a classified program, a facility or avenue.

5. The method of claim 1, wherein the person enrolled is either authorized personnel or a visitor.

6. The method of claim 5, wherein visitors ID numbers and biometric information are checked for a match at the national centralized database, and are additionally
  checked through a National Criminal Information Center before access is authorized.

7. The method of claim 6, wherein the authorization provides access for a predetermined time limit.

8. A nationwide system for centralizing personnel data and allowing access through a national access control center, the nationwide system comprising:
  an identification device or number selected from the list of:
  a) a Radio Frequency Identification Device (RFID);
  b) an ID number configured as a Social Security Number or Government issued ID Card number;
  c) an encrypted code;
    a transmission receiving device configured as an RFID transmitter and receiver;
    a national central computer system that stores a nationwide centralized database of persons;
    a communications system providing military bases, facilities, airports, and classified programs to enter authorizations into said national central computer system, said national central computer system comprising:
  i. a nationwide centralized database of one or more persons,
  ii. a nationwide centralized database of biometric data on said persons,
  iii. a nationwide centralized database of authorizations for said persons,
  iv. software that transmits and links the ID number and said person's biometrics and authorizations;
  v. software that transmits said person's biometrics to said requestor;
    a biometric sensor at said requestor's location which scans said person seeking access; and,
    biometric matching software at said national central computer system;
    transmitting from a facility requestor an ID signal to said national centralized database at the national access control center;
    matching, at said national access center, said transmitted ID signal with said person's authoritative biometrics;
    matching, at the national access control center, said ID number to said person's access authorizations;
    after matching said transmitted ID signal with said person's authoritative biometrics and matching said ID number to said person's access authorizations, transmitting said person's authoritative biometrics to a facility requestor;
    thereafter obtaining a live-scan image of said person;
    comparing said person's biometrics to a live-scan image of the person;
    determining whether the said person's live-scan biometrics match said authoritative biometrics at the national centralized database; and
    wherein the person is able to enter the facility without the requirement of biometric position pin.

9. The system of claim 8, where said biometrics matching software is incorporated into the said national central computer system allowing biometric matching at the national central computer site, in order to provide match authorizations to the requesting site.

10. The system of claim 9, wherein the person desiring access transmits an ID number for matching; wherein upon matching of the ID number, a biometric of the person is obtained by a biometric reader device and both sets of information are forwarded to the national centralized database for matching, and in response to a match, transmits an authorization signal.

11. The system of claim 9, wherein the biometrics contain at least one of an image of the person's face, an image of a finger or hand, an image of the iris the person or DNA of the person seeking access.

12. The system of claim 8, wherein the transmitted ID is one or more of an RFID tag, a social security number or a mobile phone ID.

13. The system of claim 10, wherein the authorization signal relates to one or more of a military base, an airport, a classified program, a facility or a venue.

14. The system of claim 1, wherein the person enrolled is either authorized personnel or a visitor.

15. The system of claim 14, wherein visitors ID numbers biometric information are checked for a match and are additionally checked through a National Criminal Information center prior to access being authorized.

16. The system of claim 15, wherein the authorization provides access for a predetermined time limit.

17. The system of claim 8, wherein the national access control center is located in an internet cloud.

18. The system of claim 8, wherein the national access control center is located in one or more buildings.

19. The method of claim 1, wherein the national access control center is located in an internet cloud and one or more buildings.

20. A method for centralizing personnel data and allowing access through a national access control center, the method comprising:
 a. enrolling at least one person into a national centralized database:
 b. obtaining a person's assigned ID number;
 c. obtaining a person's authoritative biometrics;
 d. obtaining a person's access authorizations provided by each facility that wishes to allow access;
 e. transmitting from a facility requestor, a request for a person desiring access to a facility or program to said national access control center; said transmission request contains the ID signal and biometrics of said person desiring access;
 f. matching, at said national access control center, said transmitted ID signal to said person's said assigned ID number and said authoritative biometrics;
 g. matching, at the national access control center, said ID number to said person's access authorizations;
 h. after matching the person's transmitted ID signal to said person's assigned ID number and authoritative biometrics, and matching, at the national access control center, said ID number to the person's access authorizations, thereafter obtaining a live-scan of the person and determining whether the person's live-scan biometrics match the authoritative biometrics at the national access control center;
 i. determining at the national access control center if a biometric and authorization match has been made; and,
 j. transmitting an authorization code or ID access device number to said facility or program requesting access, wherein the person is able to enter the facility without the requirement of a biometric position pin.

* * * * *